United States Patent [19]
Hoque

[11] Patent Number: 4,922,536
[45] Date of Patent: May 1, 1990

[54] DIGITAL AUDIO TRANSMISSION FOR USE IN STUDIO, STAGE OR FIELD APPLICATIONS

[75] Inventor: Tareq I. Hoque, Boston, Mass.

[73] Assignee: Massachusetts Institute of Technology, Cambridge, Mass.

[21] Appl. No.: 271,109

[22] Filed: Nov. 14, 1988

[51] Int. Cl.⁵ .............................................. H04H 5/00
[52] U.S. Cl. .......................................... 381/2; 381/80; 370/85.1
[58] Field of Search ........................... 381/80, 1, 2, 77; 370/85

[56] References Cited

U.S. PATENT DOCUMENTS

| | | | |
|---|---|---|---|
| 3,889,063 | 6/1975 | Slavin | 370/85 |
| 4,024,345 | 5/1977 | Kochem | 379/101 |
| 4,076,966 | 2/1978 | Bovo et al. | 370/62 |
| 4,656,629 | 4/1987 | Kondoh et al. | 370/85 |
| 4,684,981 | 8/1987 | Toyoshima et al. | 455/4 |
| 4,704,715 | 11/1987 | Shibagaki et al. | 455/615 |
| 4,815,132 | 3/1989 | Minami | 381/1 |

OTHER PUBLICATIONS

AES Recommended Practice for Digital Audio Engineering—Serial Transmission Format for Linearly Represented Digital Audio Data (ANS154,40–1985).

·Advertisement for Fiber Optic Mic Snake, VEAM Division of Litton Systems, Inc.

Primary Examiner—Forester W. Isen
Attorney, Agent, or Firm—Robert K. Tendler

[57] ABSTRACT

In studio, stage or field applications, high fidelity audio signals are transmitted to a remote processor in digital form in order to solve the problems of audio degradation, cross talk, ground loops and multi-cable problems associated with the analog transmission of multiple channels of audio over long distances. In one embodiment a TDM/FDM multiplexing system is utilized with increased bandwidth and dynamic range compared to data and telephone multiplexing systems to accommodate high fidelity requirements. In an embodiment involving a distributed system, multiple MUX and DEMUX modules are coupled in a distributive fashion along a light-weight transmission line, in which each of the modules is assigned a predetermined transmission frequency, with each of the modules having a number of audio inputs which are time-multiplexed for that particular MUX module and frequency. The Subject System precludes the necessity of running multiple audio cables to remote destinations, while at the same time providing an exceptionally quiet system, since the digital data stream is extremely tolerant to cross talk, ground loops, noise, signal attenuation, and non-linearity associated with conventional analog audio transmission.

10 Claims, 6 Drawing Sheets

DIGITAL AUDIO TRANSMISSION FOR USE IN STUDIO, STAGE OR FIELD APPLICATIONS

FIELD OF INVENTION

This invention relates to the management of audio signals in stage, field, and studio environments and more particularly to a system for the accommodation of a large number of audio signals with a minimum amount of physical cabling and signal degradation.

BACKGROUND OF THE INVENTION

High audio quality either in a studio environment or in a live performance environment is difficult to achieve especially where audio processing devices are chained together or indeed where all cabling is run to a "patch bay" or to individual pieces of equipment. In order to facilitate the recording or performance of music or vocal works, or indeed anything in which audio quality is important, in the past it has been the practice to run multiple audio cables from various audio sources directly to a patch bay. The signals from the patch bay can be routed to audio processing equipment which may include simple mixing circuits, distribution networks or equipment which introduces special effects. Maintaining fidelity in such systems is dependant in large part, on the type of cabling utilized and the proper installation of all equipment and cables according to well-established audio engineering practice.

In general, so-called analog snakes provide the required signal transmission. The audio snake is a heavy cable containing multiple shielded conductors and some unshielded lines, with the audio snake weighing as much as 150 pounds for a large installation. Moreover, due to the multi-conductor internal audio cabling, sophisticated large multi-pin connectors are used at either end of the snake.

In general, the problem with providing a link between multiple audio sources and a remotely located processor starts with the problem of field use of audio equipment and analog transmission of signals therebetween. For performances such as concerts, field remote taping and studio work, these situations involve as many as forty or fifty audio sources in the recording or performance of the audio work. Typically in these situations there are large numbers of sources of audio signals and other types of signals that are required to be transmitted from a central point to distributive points, from distributive points to a central point, or from one set of distributive points to another set of distributive points.

With all of the audio signals and control signals to be transmitted, large numbers of cables, each carrying an analog signal, have been utilized in a brute force approach, to transmit signals between different sites and a centralized processing unit within a control booth, for instance. The problem with such a system is that it is expensive, and suffers from the large number of cables which are routed in a piecemeal fashion across the floor.

More importantly, these signals typically have to travel long distances which results in a substantial amount of signal degradation. It is also very inconvenient to lay down large numbers of cables quickly and this is oftentimes a requirement in field usage. Additionally, with the advent of the above-mentioned audio snake, the cabling is not only expensive and heavy, but when numbers of side-by-side cables are encased within a single sheath, cross talk is prevalent, along with the pick up of AC hum. Further, other signals than audio signals are frequently routed through the audio snake such as control signals for the control of lights, lasers or other special effects devices. Moreover, return audio is routinely routed through the snake back to monitors at the stage or to speakers on the stage. It is therefore difficult to transmit undegraded signals having a classical bandwidth of 20 Hz to 20 kHz over long distances and with acceptable purity.

While the audio snake has in part taken the place of the routing of multiple wires from multiple audio sources directly to the patch bay, audio snakes may be 1-2" in diameter, and may carry as many as 50 audio cables side by side. As noted, each snake is expensive, as are the relatively complex connectors which are required at either end of the audio snake to attach the cable to connector boxes.

Frequently what is found in some installations is that low level signals and the higher level signals are mixed in the same snake cable which provides an opportunity for cross talk between the two sets of signals. If one has signals from microphones mixed in with signals for instance from power amplifiers, one can obtain regenerative feedback oscillation because one can have outputs being cross talked into the inputs and this can cause a continuous recirculation of the signal which leads to oscillation and other instabilities. Crosstalk as used herein refers to the mixing of a signal in one channel into a signal transmitted in another channel, with this problem being especially acute in studios where high quality is absolutely mandatory and channel separation is one of the requisites.

It will be appreciated that the signal strength through each of the channels of the audio snake can vary anywhere from a very low level microphone output which is not recommended but is often done, to high levels associated with speaker outputs. The mixture of different levels can be troublesome even for line output levels on the order of 1 volt RMS which is usually available after a microphone output has been amplified.

With respect to line loss, it has been recommended that for 250 ohm microphones the frequency losses above 10 kHz are significant if the cable length is on the order of 200 feet. The 10 kHz cutoff is significantly in the audible range, and cable lengths of over 200 feet are not uncommon, especially for performances on stages and in auditoriums or athletic fields. This causes significant high end signal degradation.

Degradation in general takes three forms. It can be the addition of noise, the introduction of non-linearities, or it can be the droppage of the higher frequency components of an amplified signal. Additional noise, including cross talk and ground loops, can occur at all frequencies but is usually in the form of either 60 Hz hum or high frequency interference, such as RF interference or spurious oscillations.

In order to minimize cross talk, traditional analog cables have utilized shielding in order to isolate the signals carried by the cables within the bundle. In less expensive audio snakes there is only one main shield. This causes considerable cross talk problems because there is considerable unwanted interference between signals transmitted along the unshielded cables which are bundled together.

The ground loop problem is also a large problem in the field and even in studio applications where very low level signals have hum introduced because of improper grounding problems. This can be even more magnified when there is no DC isolation between the signals.

In order to minimize audio degradation in a large concert set up, instead of plugging a microphone directly into the audio snake, one can pre-amplify the microphone signal to boost the signal so that it can be sent further distances. However, the amplification in and of itself causes problems. These problems include the aforementioned noise, and the problems of ground loops, with the ground loop problem being severe when amplifiers are improperly grounded, which is frequently the case in non-permanent, and some permanent set-ups. The ground loop problems can be solved by the utilization of isolation transformers at either end of cable. However, the utilization of isolation transformers in itself introduces problems of non-linearity and saturation.

Thus, in the past in order to solve the problems associated with multiple audio signals in either stage or studio applications, relatively creative analog approaches have been utilized in order to provide signal transmission from the audio source to a remote audio processing unit. However creative, all analog approaches suffer from the above-mentioned problems.

SUMMARY OF THE INVENTION

In contradistinction to the utilization of conventional analog type transmission between remotely located audio sources and processing centers, in the Subject Invention the audio is converted to a digital representation at the audio source and then is transmitted in a multiplexed manner over a light-weight coaxial cable, or even a fiberoptic or twisted-pair cable, with the multiplexing and demultiplexing being of such a nature that little signal degradation occurs. Also RF transmission of digitized audio is within the scope of this invention.

The advantage of digital transmission is that signal degradation is no longer a significant problem. Thus ground loop problems are eliminated, as are 60 cycle hum and RF interference. The Subject System therefore provides an extremely "quiet" method and apparatus for transmitting high fidelity audio signals from as many as several hundred audio sources to remote processing units. This system also solves the problem of massive amounts of expensive cabling in an audio installation which can get unmanageable; as well as solving the problem of the utilization of a single but bulky and expensive audio snake with its attendant cross talk, ground loop and other degradation problems.

In one embodiment of the Subject System, an FDM/TDM multiplexing system is used. Synchronization of the TDM occurs by the provision of sync pulses for every strobe cycle rather than having an additional line carrying a synchronization pulse. The sync pulse in one embodiment, is differentiated from data by its signature so that it will never appear to the demultiplexing circuits as legitimate audio data. In one embodiment, four audio signals are digitized into a single serial data stream. The stream of data has a rate of approximately 4 megabits per second which in turn is frequency division multiplexed, such that for each set of four audio sources which are time division multiplexed there is a predetermined frequency associated therewith. These frequencies can be chosen either for coaxial cable or fiberoptic cable, with coaxial cable being able to handle several hundred megabits per second or several hundred megahertz of bandwidth. Since each MUX channel consumes close to 6 MHz and since there are typically 4 audio channels per MUX module, one can multiplex several hundred audio signals into a single coaxial cable. Six megahertz wide frequency channels are selected as an optimum trade-off of channel space overhead vs hardware efficiencies.

With respect to the multiplexing system, the individual microphone or audio source outputs can be fed through individual cables to a centralized multiplexer from whence the coaxial cable is lead to a remote demultiplexing unit. While this system solves the problem of long lengths of cable, it is not as convenient as utilizing a distributed system in which MUX modules are utilized in close proximity to groups of audio sources. In a preferred embodiment, the connecting cable spline is fed to modules located remotely; and in a further embodiment, instead of cutting a wire and inserting a "tee" connector, each MUX module may be connected to the next adjacent MUX module through suitable input and output connectors by daisy chaining MUX and DEMUX units. Note that DEMUX units may be used at the stage to demultiplex return audio or other signals.

One advantage of employing digital audio transmission by this method in the recording or processing of audio for stage and studio performances is a lower cost for longer distance transmissions, as opposed to the traditional audio snake which cable may be on the order of several dollars per foot in cost. The Subject System is implemented at a fixed cost, plus a substantially lower incremental cost for longer distances.

Moreover, since every DEMUX unit is exposed to all multiplexed signals it becomes possible to reallocate a DEMUX channel in real time from even a remote location. Thus, the setup configuration on stage can be altered or modified at a control booth, with different microphones being reassigned to different channels. This prevents having to physically move or rewire microphones which are already in place on a stage. This adaptability can be easily accomplished by having every MUX and DEMUX module continually "listen" on DC signalling or a pre-assigned configuration channel.

Most importantly, the system is a "quiet" system in which there is negligible signal degradation in the transmission. One can transmit all the required signals several thousand feet and obtain the same amount of quality as if one were transmitting the signal only several inches; this is because digital signals are less susceptible to degradation.

The utilization of digital communication solves the problem of ground loops because it is very tolerant of analog interference. The system is essentially isolated so that if one has a ground loop on the coaxial cable it does not manifest itself in the audio signal.

The Subject System also eliminates the problems of expensive multi-pin connectors, cables, and connector boxes and solves the problem of the weight of the audio snake cable in which one does not have to worry about supporting a very heavy cable which can be a problem in a large installation where these cables can weigh several hundred pounds. Trying to suspend an audio snake from an overhead is eliminated by the use of light weight coaxial or fiberoptic cables involved in the Subject Invention. RF transmission provides even further convenience. Also it will be appreciated that after digital encoding there is no amplification and therefore the problems associated with non-linear amplification, oscillations and other degradation is eliminated by the digital transmission between the audio source and the audio processing unit. Additionally, the digitally coded signal is easily accepted by digital processing equipment that is becoming increasingly prevalent in the audio industry. This multiplexing and transmission scheme is ideally suited for digital audio processing equipment which frequently converts digital signals into analog signals for transmission even when the following stage is another digital processor. By using the Subject Invention's digital transmission method, needless conversions and their associated cost, complexity and degradation, are eliminated. Finally, the transmission network that is established by the system is not inherently limited to the distribution of audio signals. Other data that can be adapted and distributed by this system includes, lighting, time codes and synchronization, video, MIDI, and other forms of data.

PRIOR MULTIPLEXING SYSTEMS

By way of further background, in prior multiplexing systems frequency domain multiplexing systems have been used primarily for data communications, as have time division multiplexing systems. For data communications, especially with respect to the Wangnet system, the multiplexing and the demultiplexing will not support data transfer faster than a 19,000 bit per second rate per channel. While this is sufficient for digital data, a typical high fidelity audio signal when PCM coded is close to a megahertz in bandwidth. Thus, typical data communications multiplexing and demultiplexing is not capable of supporting high fidelity audio.

For audio bandwidths on the order of 1 megabit per second per audio channel, and with the possibility of several hundred audio channels, the system must accommodate several hundred megabits per second in real time. Typically there may be as many as 24-48 audio channels in a live performance. In such a case, in order to provide the subject digital transmission the system would be required to accommodate 48 megabits per second in real time.

As mentioned before, in the data communication field there are no multiplexing and demultiplexing systems which can handle this requirement and still be a distributed system, where audio signals may be introduced or extracted from anywhere along the transmission media. There are however multiplexing and demultiplexing systems in the telephone field. However transmission systems in telephony are oriented to different criteria and are not acceptable for high fidelity transmission. Transmission over telephone lines is relatively band-limited in that for telephone quality signals, all that is required is a 300 Hz-3 kHz passband. Anything beyond 3 kHz is cut off. Therefore those multiplexing and demultiplexing systems utilized in the telephone field cannot support the requirement for high fidelity.

Moreover, the dynamic range supported by telephone multiplexing systems is considerably less than the dynamic range required for the studio or live performance situation. For instance telephone PCM information is represented by an 8 bit number, where the dynamic range is 1 part in 256 or 48 dB. In the high fidelity audio situation, a minimum 16 bit number is required. Therefore, the telephone will not accommodate the dynamic range of 1 part in 65,536 or 96 dB. This means that the telephone system multiplexing and demultiplexing systems cannot even come close to the capability that is demanded in a high fidelity system. Again, the telephone multiplexing schemes are not designed to be distributed, but are point-to-point.

Finally, it should be noted that there are television multiplexing and demultiplexing systems for the distribution of TV and digital audio signals such as described in U.S. Pat. No. 4,513,315 and U.S. Pat. No. 4,704,715. These systems were not envisioned as being usable or desirable in a studio or live performance situation; nor were they designed for studio quality audio processing. Moreover, cable and subscriber TV multiplexing requirements are different from those associated with studio quality audio. In a CATV system the audio signals originate from one point and thus the CATV system is not a truly distributed system. Additionally, these CATV systems go to great lengths, in terms of added complexity and channel inefficiencies, to minimize problems that are associated with wide-area CATV distribution networks that would not be encountered in the audio transmission applications envisioned here. Specifically, the CATV systems employ complex modulators to address the problems of signal echo encountered in less than ideal outdoor installations.

Other patents illustrating TDM/FDM systems are U.S. Pat. Nos. 4,715,029; 4,598,398; 4,589,018; 4,590,595; 4,510,598; 4,553,101; 4,479,240; 4,438,511; 4,397,019; 4,389,538; 4,312,062; 4,199,660; 4,171,467; 4,075,429; 4,013,842; 3,959,595; 3,736,374; 3,655,917; 3,637,940; 3,573,379; 3,519,747; 3,471,646; 3,435,147; and, 3,370,128.

BRIEF DESCRIPTION OF THE DRAWINGS

These and other features of the Subject Invention will be better understood in connection with the Detailed Description taken in conjunction with the Drawings of which.

DETAILED DESCRIPTION

Figure 1:
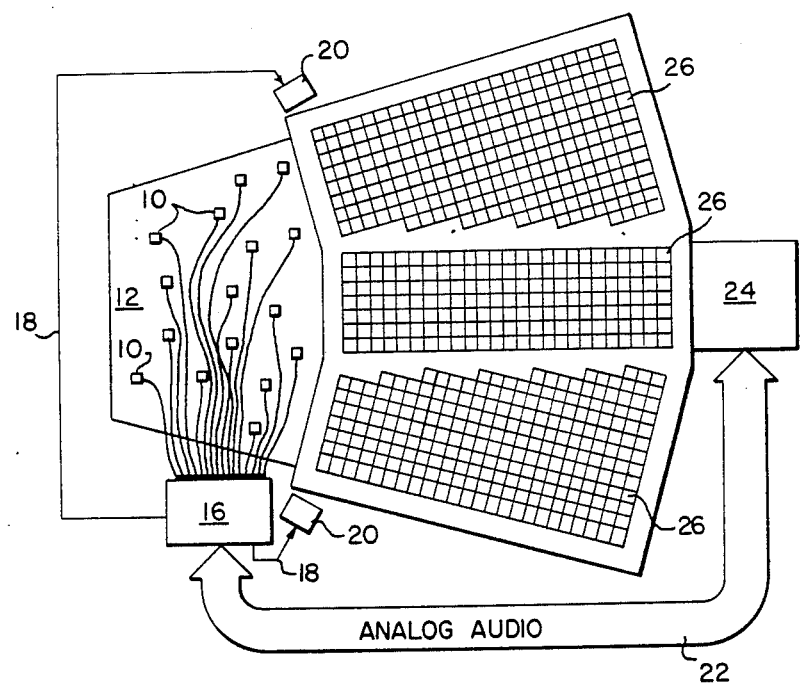
FIG. 1 is a diagrammatic representation of prior art system involving a concert stage in which multiple audio sources are connected from the stage to a control booth through an analog audio transmission system, usually employing the aforementioned audio snake.

Referring now to FIG. 1, in one of prior art installation multiple audio sources in the form of microphones 10 are positioned across a stage 12 and are connected via numerous individual cables 14 to a central patch bay 16 at one side of stage 12. In addition to the connection of the audio sources via cables 14 to the patch bay, patch bay 16 also includes lines 18 to apply return audio to monitors or speakers 20 located at or in the vicinity of the stage.

The audio cables, corresponding one each to an audio channel, are routed through the aforementioned audio snake 22 to a control booth 24 located at the rear of the auditorium at a distance, usually in excess of 200 feet from the stage. It will be appreciated even in modest theaters such as illustrated by the seating arrangement 26 that significant signal degradation occurs due to the length of audio cable that is utilized, and due the aforementioned cross talk and ground loop problems. Also, as mentioned hereinbefore, the length of the audio snake requires a considerable amount of weight be suspended when running the snake from the stage to the control booth. Moreover, personnel running the control booth are often faced not only with low level signals and noise or hum picked up from the long run of cable, they are also confronted with the initial set up of the stage in terms of placing the microphones and the running of the large numbers of cables to the patch bay. In a typical initial set up it may take two hours or more to position cables and microphones across the stage so that the cables will be neat and orderly and not be in the way, and so that cross talk, noise and ground loops in the set-up are minimized. Additionally, modifying the set up is difficult in the system depicted in FIG. 1 because of the tangle of cables, the complexity of cable markings, and the inability to identify the particular cable associated with a particular input channel.

It will be appreciated that the entire system illustrated in FIG. 1 involves analog transmission techniques, including analog connection and switching, in order to be able to effectuate the audio transmission from the stage to the control booth and visa versa. In order to switch, for instance, a microphone from one channel to another channel it is necessary to physically reconnect this particular microphone at the patch bay, a task which is both cumbersome and time consuming.

Figure 2:
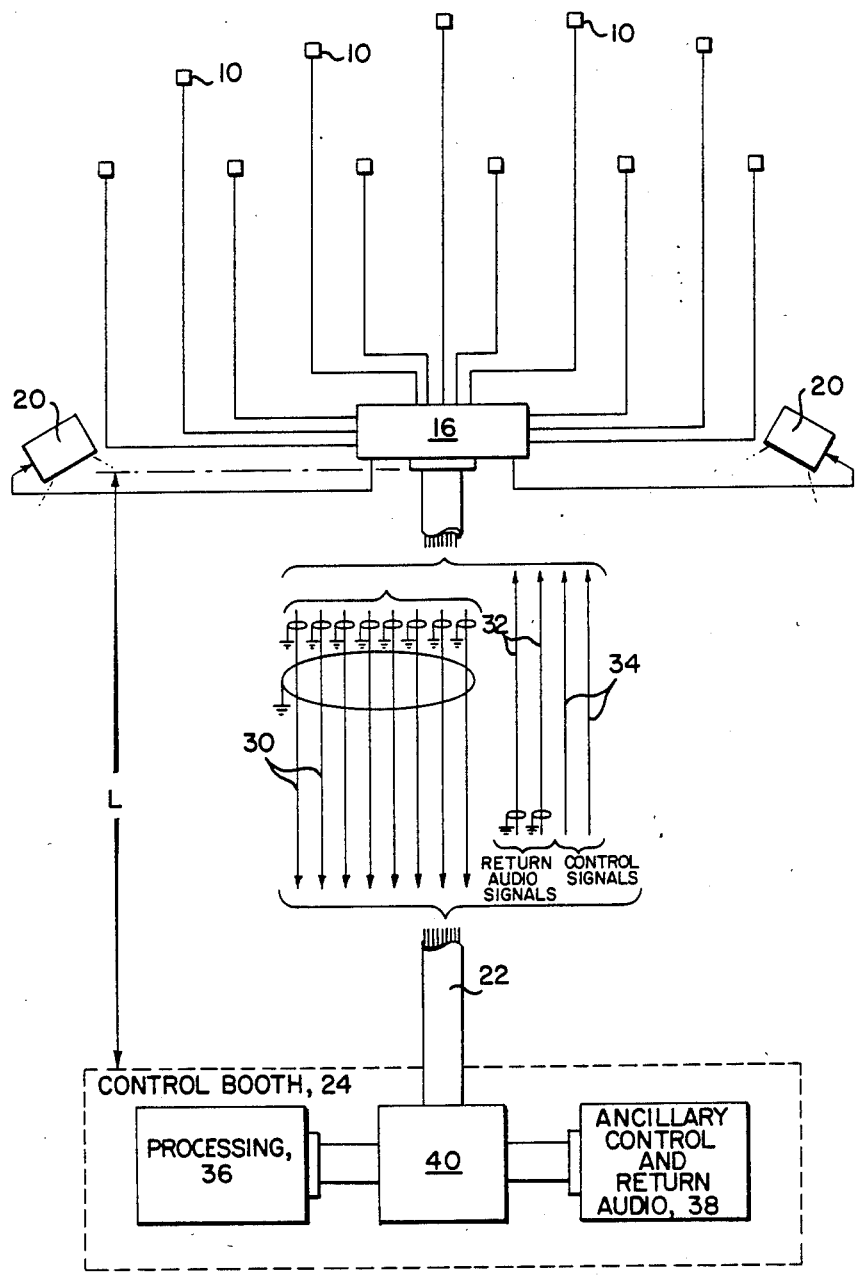
FIG. 2 is a schematic diagram of the prior art system of FIG. 1 illustrating the multiple audio sources and, more importantly, the utilization of multiple shielded audio cables within the snake both for the transmission of signals from the stage to the control booth and for the transmission of return audio and control signals to the stage.

Referring to FIG. 2, not only are the problems in the prior art system FIG. 1 limited to the stage. Rather, as can be seen in this diagrammatic illustration in the more expensive of the audio snakes each individual audio line is a shielded cable here illustrated at 30 which is run usually in parallel with as many as 49 other audio cables going in the direction of control booth 24. Likewise there may be 2 or more audio return lines 32 again running in parallel but in opposite directions to the aforementioned audio lines. Should special effects be desired on stage, control signals may be delivered over lines 34 to patch bay 16 where they are distributed to the various devices which they control. The incoming audio is processed at a processing unit 36, whereas the return audio signals and control signals may be generated at a separate unit, here illustrated by reference character 38. It will be appreciated that the connection of audio snake 22 to processor 36 and processor 38 may be done through a patch bay junction box 40.

It will be appreciated that the processing which takes place at the control booth usually involves a mixer, the outputs of which may then be coupled to graphic equalizers, compressors, expanders, special effects units for introducing time delays, enchancers of every kind, and storage devices such as magnetic storage, either tape or disc.

With respect to the ancillary control and return audio processing unit, this unit may in fact be coupled to processing unit 36, or the mixer thereof, to provide return audio signals for the on-stage monitors. It will be appreciated that the audio signals from patch bay 16 may have levels on the order of 100 mV RMS, whereas return audio may include amplified return audio signals which may be an order of magnitude higher.

In general, the difficulty of long distance transmission of audio signals in an analog fashion is both the likelihood of cross talk, even in the best of shielded cable, as well as the pick up of AC hum from 60 cycle sources both from lighting and from ground loops and other equipment on stage. Additionally, if any motorized devices are utilized within the area such as lighting equipment motors or on stage motor drives, the effect of actuating these devices is extremely deleterious to the recording of quality audio or even the reproduction of audio for audience usage.

Of course any RF interference from radio sources which are quite frequently in the vicinity of the stage produce unwanted transient effects.

The ubiquitous ground loop problem is ever present. As discussed, in a poor set-up the level of the AC hum can completely overwhelm the audio signals. AC hum is introduced primarily because of grounding and isolation problems which are particularly severe in view of the mobile and distributed utilization of such systems due to improper configuration of faulty connectors or faulty grounding of any kind. Such noise can also occur from improper set up due to poor adherence to commonly accepted practices for connection and routing of audio cables.

Referring now the FIG. 3, in the Subject Invention stage 12 is provided with the self-same microphones or audio sources 10 which are again routed to a central location here illustrated by reference character 40. This central location is provided with a multiplexing/demultiplexing unit 42 which, in a preferred embodiment, both time and frequency multiplexes the incoming analog signals by first converting them to digital form through analog-to-digital converters. This provides serial transmission of the digitized audio over a multiplexed digital audio link 42 to a remote location, in this embodiment control booth 24. While in the illustrated embodiment of FIG. 3 there still exists multiple short analog cables, the majority of the transmission path is accomplished by a coaxial cable, a fiber optic cable, or indeed an RF link should such be desired. This link between stage and control booth is extremely light weight and has the necessary bandwidth to accommodate the transmission of the digitized audio to and from the remote location. As will be appreciated coaxial cable has a bandwidth in excess of 500 megahertz, clearly sufficient for multiple channel audio transmission. Of course fiber optic cable has a bandwidth almost two orders of magnitude greater than coaxial cable. However, fiber optic cable, may be utilized if desired.

For runs of any length, especially in excess of 100 meters, the Subject System is exceptionally quiet because of the utilization of digital audio. The digital format does not suffer from degradation problems in the way that analog signalling does; and all of the aforementioned ground loop and cross talk problems are completely eliminated due to the transmission of digitized audio in whatever multiplexed format. This transmission scheme is as near to a lossless system as can be achieved. Signal quality problems are insignificant compared to those associated with analog audio transmission. Sufficient bandwidth is currently available through the utilization of TDM/FDM systems when adapted for high fidelity audio transmission through the utilization of analog-to-digital converters and digital-to-analog converters having 16 to 18 bit capacities. Thus while frequency and dynamic range problems exist with respect to the multiplexing systems utilized in telephone systems, the advances in analog-to-digital conversion and digital-to-analog conversion make the fabrication of a high fidelity multiplexing system within the state of the art. The FDM/TDM system suggested in one embodiment of the Subject Invention is at least in order of magnitude faster than the systems provided for data communications. State of the art technologies capable of handling dynamic ranges of at least 90 dB are presently available. Thus dynamic range problems associated with prior telephone multiplexing do not exist here.

Also the problem of the high frequency cut off for analog snakes above 10 kilohertz is completely eliminated through the use of digitized audio; and unlike analog signalling, the transmitted audio signals do not degrade as distance increases.

Figure 3:
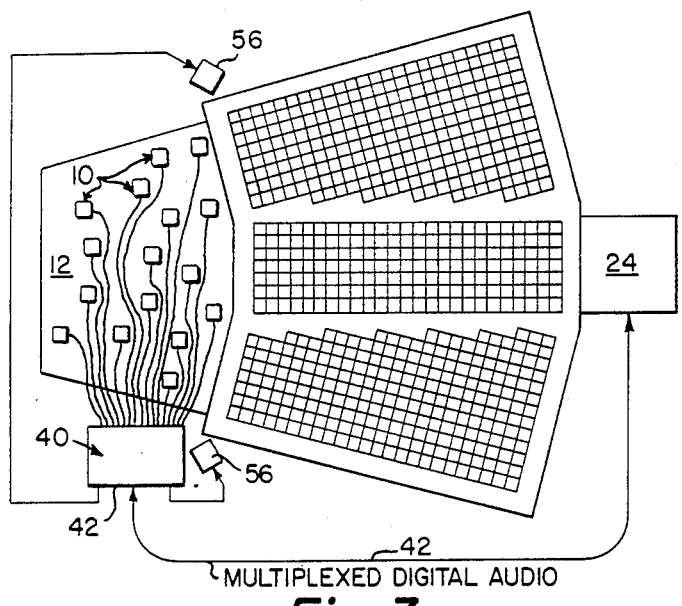
FIG. 3 is a diagrammatic illustration of the Subject System in which audio transmission to and from the stage is in the form of multiplexed digital audio, thereby to provide a quiet, attenuationless transmission system for high quality audio.
Figure 4:
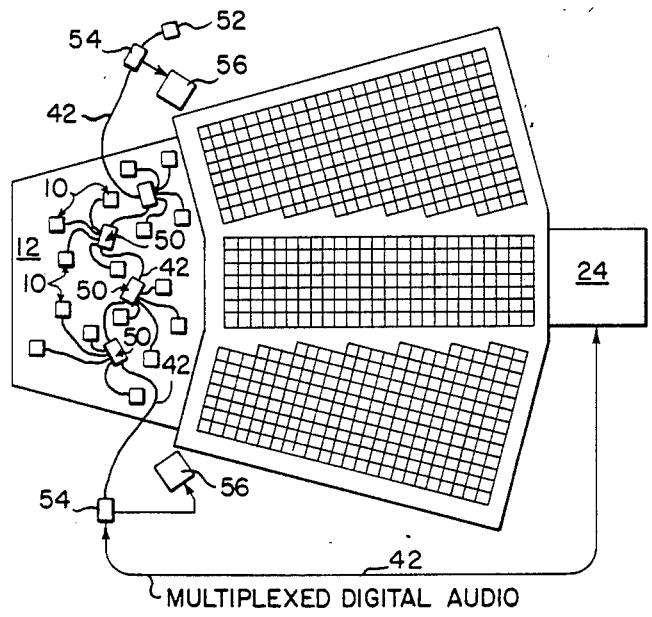
FIG. 4 is a diagrammatic illustration of a distributed implementation of the system of FIG. 3 in which MUX and DEMUX modules are daisy chained along the transmission line across the stage to provide for efficient and easy accommodation of multiple sources and destinations for the audio signals.

Referring now to FIG. 4, a distributed embodiment of the Subject System eliminates the tangle of short audio lines between the audio sources and the point at which the audio sources are multiplexed for transmission to a remote location. In this figure the audio sources, here also illustrated as microphones 10, are placed where ever desired across stage 12. In this embodiment 4 microphones are associated with a single MUX unit 50, with MUX units 50 being distributed along cable 42 in a daisy chain fashion. It will be noted that cable 42 is terminated at 52, as would be expected. In addition to MUX units 50 being distributed along cable 42, DEMUX units 54 for processing signals from control booth 24 are also distributed along cable 42. In the illustrated embodiment the DEMUX units are utilized to provide signals to monitors and loudspeakers 56 located adjacent stage 12. It will be appreciated that the utilization of a distributed system at the stage provides not only for shorter analog cables to be utilized between the sound source and the distributed point, it also eliminates clutter on stage and more easily permits definition or identification of the signal source without tagging a tangle of microphone cables. A single coaxial or fiber optic cable may be snaked across the stage from which ultra short cabling runs. Thus this distributed system is not anywhere near as obtrusive as the situation depicted in either FIG. 1 or FIG. 3.

In both the FIG. 3 and FIG. 4 embodiments there is in fact two-way communication permitted between locations so that, for instance, in FIG. 3, a demultiplexing circuit in unit 42 can be provided to demultiplex return audio or control signals for monitors 56.

While the aforementioned TDM/FDM multiplexing system is useful in the Subject System, virtually any type of transmission system which provides a serial stream of data to and from the spaced apart locations is within the scope of this invention. Token-ring, packet switching, or other networking technologies are also encompassed within the scope of this invention, when used for the real-time transmission of audio data.

Figure 5:
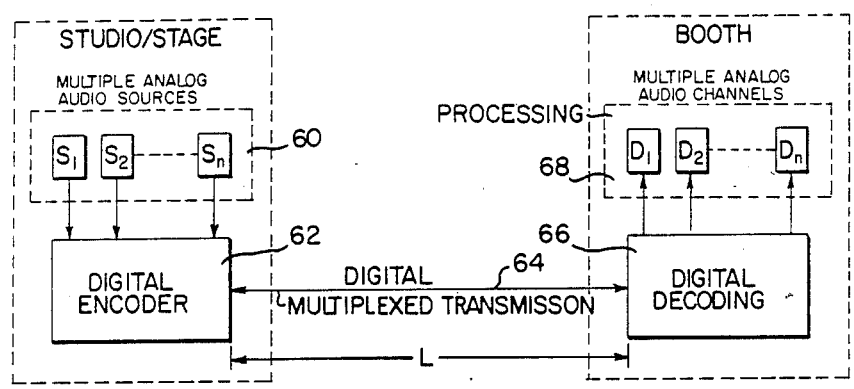
FIG. 5 is a block diagram of the Subject Invention illustrating the use of one-way digital multiplexed transmission between multiple analog audio sources at one location and multiple destinations for analog audio channels at a second location.

Referring now to FIG. 5, in essence the Subject System involves multiple analog audio sources 60 which have outputs provided to a digital encoder 62 which encodes the signals in such a manner that they may be transmitted as a digital stream on transmission line or path 64 to a remote location at which point digital decoding 66 is accomplished. The digital decoding reconstructs the original audio channels and routes these channels to multiple destinations 68. What is thus depicted in FIG. 5 is a simple one-way digital multiplexed audio transmission system which eliminates all of the aforementioned problems with analog long-distance signalling.

Figure 6:
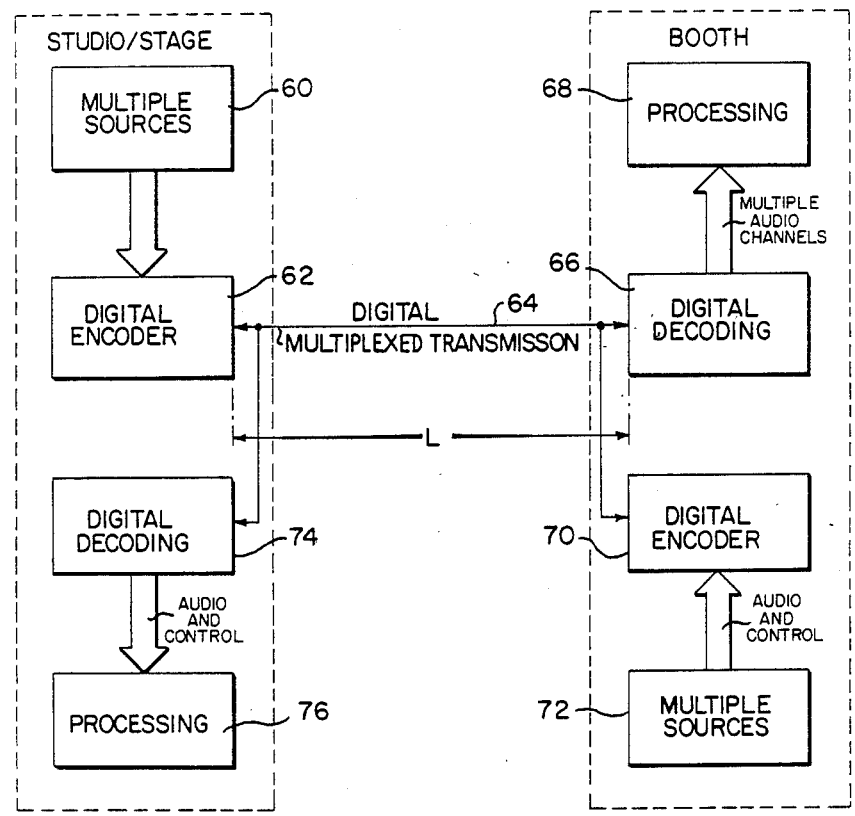
FIG. 6 is a block diagram illustrating two-way communication via digital multiplex transmission between a studio/stage location and a booth.

Referring to FIG. 6 should two-way communication be desired a digital encoder 70 may be provided with signals from multiple sources 72, which sources may include both audio and control signals. The output of digital encoder 70 is coupled to transmission line 64, with these signals being decoded by a digital decoding unit 74, from whence the return audio and control signals are reconstructed and passed to a suitable processing unit 76.

In summary, the Subject System is one in which multiple audio channels are transmitted to a remote location by use of digital multiplexed transmission techniques.

Figure 7:
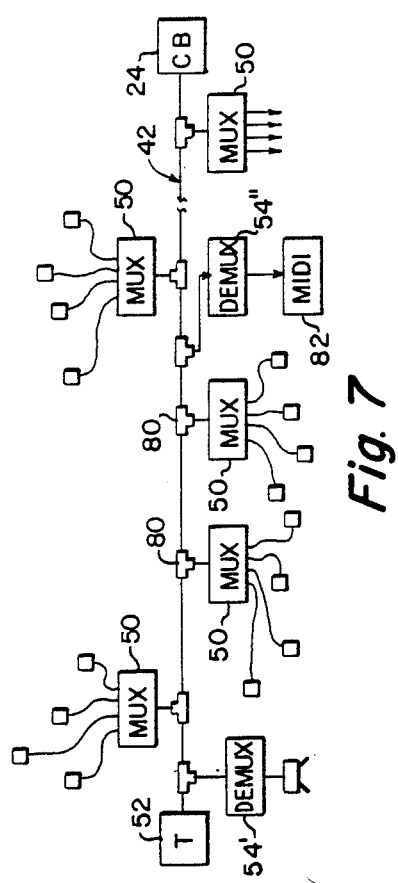
FIG. 7 is a diagrammatic illustration of a distributed system in which connection of MUX and DEMUX units to a transmission line is accomplished through the utilization of a "tee", with MUX and DEMUX units tapped along the line as required.

Referring now to FIG. 7 what is depicted here is a distributed network in which MUX units 50 are distributed along cable 42 through the utilization of "tee" type connectors here illustrated at 80. Also distributed along cable 42 are DEMUX units 54' and 54", with a DEMUX unit 54' demultiplexing signals directed to on stage monitors, whereas DEMUX unit 54' demultiplexes signals provided to a MIDI unit 82 or any other controller. Here MIDI is a common designator for musical instrument digital interface, which units are available commercially. MIDI units are conventionally utilized for the transmission of digital data between musical instruments and are not utilized for the real-time transmission of audio information.

Figure 8:
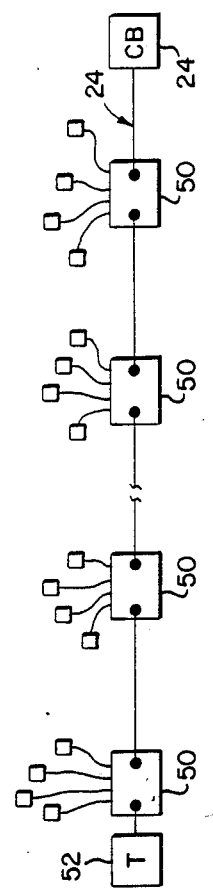
FIG. 8 is a diagrammatic illustration of a distributed system in which MUX or DEMUX modules are daisy chained along a transmission line; and, FIGS. 9A and 9B are schematic and diagrammatic illustrations of one embodiment of a multiplexing system for use in the Subject Invention, in which TDM/FDM multiplexing is illustrated.

Referring now to FIG. 8, a distributed system is illustrated in which DEMUX units 50 are daisy chained along transmission line 42 for the purposes described above. The advantage of the utilization of such a daisy chaining system is the elimination of "tee" type connections, although suitable other types of connections are necessary for each MUX or DEMUX unit distributed along line 42.

MULTIPLEXING SYSTEM

Figure 9A:
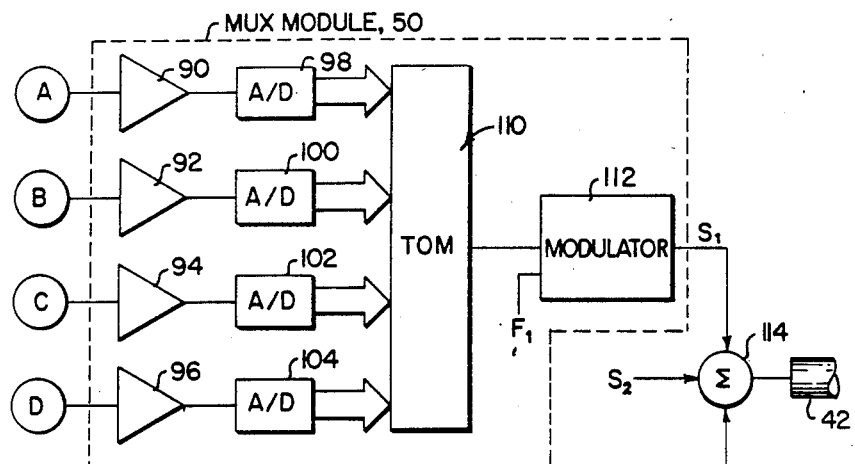
Figure 9B:
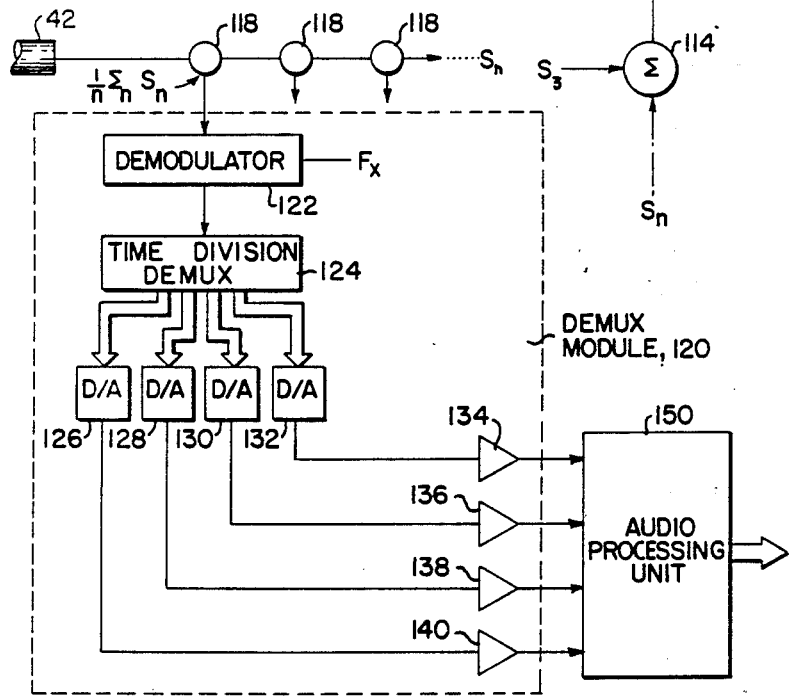

Referring now to FIGS. 9A and 9B, a TDM/FDM system is illustrated in which for each MUX module 50 there are provided four inputs, here illustrated by sources A, B, C, and D. The outputs of these sources are amplified at 90, 92, 94, and 96 by conventional amplification means and are provided to specialized high speed 16 bit analog-to-digital converters 98, 100, 102 and 104, available from several commercial sources. It is the property of these analog-to-digital converters that they have sufficient dynamic range to accommodate the types of acoustic signals applied thereto. The dynamic range in general for the high fidelity recording and reproduction systems for which the system is to be used should be in excess of 90 dB and can require that the analog-to-digital converters have a 16 bit resolution; although 18 and greater bit capacities are currently within the state of the art. These analog-to-digital converters are strobed at a frequency of 48,000 times a second to provide for the time multiplexing which is accomplished conventionally by time multiplexing unit 110. In one embodiment the output of each individual analog-to-digital converter is sampled by the TDM unit, which after sampling one analog-to-digital converter proceeds on to the next. The output of the time division multiplex unit is a bit stream which is coded in a conventional manner to identify not only the information from each of the analog-to-digital converters but also the identity of the analog-to-digital converter. This bit stream is modulated at modulator 112 by a frequency $f_x$, which in one embodiment is a frequency between 10 and 500 megahertz so as to be demodulatable as such at the remote location. This provides a signal $S_1$ to a summing node 114, with signals $S_2$ and $S_3 \ldots S_n$ applied to summing nodes 114. Thus the signals from each of the MUX modules are applied to cable 42.

The signal on cable 42 is sampled through splitter 118 at a remote location having a DEMUX module here illustrated by 120 to include a frequency demodulator 122 which demodulates a predetermined frequency of $f_x$ at any given time. The output of demodulator 122 therefore selects the particular MUX module to be received, at which point data therefrom is passed to a time division demultiplexer 124, the outputs of which corresponds to channels A, B, C, and D. The outputs of the time division multiplex unit are digital signals which are then supplied to digital-to-analog convertors 126, 128, 130, and 132 which reconstruct the original audio signal on the respective channel. The output of digital-to-analog convertors 132 are conventionally amplified at 134, 136, 138, and 140 and are thereafter supplied to an audio processing unit 150 which processes the analog audio signals as desired. Both A/D and D/A converters are not necessary if the source or destination equipment is capable of supplying or using digital audio signals directly.

Thus, the subject TDM/FDM system is enhanced over the aforementioned Wangnet system in that the data capacity is significantly greater than Wangnet capability and on the order of 4 megabits/second per MUX channel. This is 3 or 4 orders of magnitude greater than the rates utilized for serial data communications multiplexing systems.

With respect to telephone type TDM/FDM systems, the dynamic range accommodatable by the Subject System is two orders of magnitude larger than that associated with telephone systems. Moreover, telephone multiplexing systems do not typically employ a TDM/FDM combination. Moreover, channel spacing in the Subject System vis-a-vis that of a telephone system is again three orders of magnitude larger.

It will be appreciated that channel spacing is important in the Subject System in order to provide for required audio fidelity through higher data rates.

It will also be appreciated that the Subject TDM/FDM System is desirably operated in the VHF frequency band to facilitate the use of coaxial cable. However, the Subject System is different from the above mentioned CATV systems in that the systems of the aforementioned patents do not envision multiple audio sources for distribution of these audio sources along a transmission line. Nor do these patents contemplate processing the audio sources in multiple separate channels at any destination. Note that in U.S. Pat. No. 4,513,315 the TDM/FDM conversion is to reduce signal echoes. Moreover, the Subject System employs large numbers of audio channels multiplexed both in time and frequency domains, with frequency allocation for MUX designation, not type of signal.

With respect to U.S. Pat. No. 4,704,715 this is in essence a point-to-point cable system in which optical fibers are utilized and in which there is frequency division multiplexing only in terms of phase shifting for optical purposes. This system is not a distributed system. Nor does it contemplate the accommodation of multiple audio sources.

It will be appreciated that the Subject System contemplates multiple audio source in terms of more than just left and right stereo processing. The term multiple sources, as used herein, means sources that are distinct in location in terms of the production of the sound, or distinct in terms of the audio that is produced. What this says is that the multiple source nomenclature used herein does not contemplate stereo processing a single sound source which develops left and right components; but rather sources which are physically distributed or sources which have no acoustic relation, one to the other.

Having above indicated a preferred embodiment of the present invention, it will occur to those skilled in the art that modifications and alternatives can be practiced within the spirit of the invention. It is accordingly intended to define the scope of the invention only as indicated in the following claims:

I claim:

1. A quiet high fidelity audio transmission system for use in stage, field, and studio applications for long distance transmission of multiple channels of high fidelity audio between spaced apart locations with reduced degradation and noise, in which multiple sources of audio signals are available from different points at one location, comprising a digital snake including:
    means for multiplexing said multiple sources of audio signals at said one location so as to provide a digital data stream with a digital format corresponding to separate audio channels;
    a transmission line having a suitably wide bandwidth exceeding 1 MHz/channel for transmitting said digital data stream from said one location to a remote location; and,
    means for demultiplexing the transmitted signals at said remote location so as to produce analog audio signals in multiple high fidelity audio channels, whereby problems associated with analog transmission of audio signals over long distances are eliminated by using the multiplexed digital transmission format, said system being a distributed system including a number of MUX units tapped along said transmission line, thereby to minimize analog cabling requirements and complexity at said one location.

2. The system of claim 1 wherein said multiplexing and demultiplexing means includes TDM/FDM multiplexing means.

3. The system of claim 1 wherein said multiplexing means including analog-to-digital converters.

4. The system of claim 3 wherein said analog-to-digital converters are at least 16 bit devices for adequate hi-fi dynamic range.

5. The system of claim 1 wherein said demultiplexing means includes digital-to-analog converters.

6. The system of claim 5 wherein said digital-to-analog converters are at least 16 bit devices for adequate hi-fi dynamic range.

7. A digital snake for the long distance transmission of multiple channels of audio from separate audio sources at locations distributed along a transmission line, comprising:

means at each location for multiplexing the output of multiple sources of audio into a digital data stream;

means for applying said digital data stream to said transmission line, said transmission line having a bandwidth of at least 1 MHz/channel; and, means coupled to said transmission line at a remote location for demultiplexing said digital stream into separate channels of audio.

8. The system of claim 7 and further including more than one source of audio at each multiplexing location.

9. The system of claim 8 and further including means for applying bidirectional digital signals on said transmission line and means for demultiplexing selected bidirectional digital signals at selected distributed locations on said line, whereby said system accommodates bidirectional long distance transmission of audio.

10. The system of claim 9 and further including means within said multiplexing means for generating digital control signals multiplexed within said digital data stream; and, means within said demultiplexing means for demultiplexing said control signals, whereby control signals can be transmitted along with digitized audio signals.

* * * * *